United States Patent [19]
Hendrix

[11] Patent Number: 5,588,982
[45] Date of Patent: Dec. 31, 1996

[54] PROCESS FOR PRODUCING FOUDRY IRON

[75] Inventor: Charles F. Hendrix, Pell City, Ala.

[73] Assignee: Alabama Power Company, Birmingham, Ala.

[21] Appl. No.: 431,845

[22] Filed: May 1, 1995

[51] Int. Cl.⁶ .................................................. C21B 11/10
[52] U.S. Cl. ........................ 75/10.50; 75/10.61; 420/33
[58] Field of Search .................... 420/29, 33; 75/10.22, 75/10.5, 10.66, 10.6, 10.61, 10.50

[56] References Cited

U.S. PATENT DOCUMENTS

| | | | |
|---|---|---|---|
| 2,242,219 | 5/1941 | Baily | 420/29 |
| 3,768,997 | 10/1973 | Bliss et al. | 75/10.5 |
| 4,491,472 | 1/1985 | Stevenson et al. | 75/10 R |
| 4,613,363 | 9/1986 | Wienert | 75/10.62 |
| 4,731,112 | 3/1988 | Hoffman | 75/10.22 |
| 4,995,051 | 2/1991 | Hakulin et al. | 373/81 |

OTHER PUBLICATIONS

"Generation and Utilization of Heat in a Slag Resistance Electric Furnace", Themelis, Columbia University, Aug. 1988.
"Reclaiming Metal Values from Spent Pickling Wastes", Hanewald et al., INMETCO, Ellwood City, PA, Oct. 18–20, 1993.
"CONTIARC, A New Melting Technology", Hofmann et al., Second Int'l Symposium on Metallurgical Processes for the Year 2000 and Beyond, San Diego, Sep. 1994.
"Electric–Furnace Ironmaking in Venezuela", *Journal of Metals*, Sep. 1963.
"New Zeland Steel: A Decade of Progress", *Metal Bulletin Monthly*, Mar. 1980.
"Direct Reduction at New Zeland's Glenbrook Works", Evans, *Steel Times International*, Dec. 1986.
"Refining Liquid Pig Iron Electric Arc Furnaces", Durrer et al., *Journal of the Iron and Steel Institute*, May 1959.
"Arc Furnace Iron Competes", *Steel*, p. 40.
"Electric Ironmaking Furnaces, A Competitor to the Blast Furnace?", Astier, *Journal of Metals*, Sep. 1963.
"Prospects Brighten for NZ Steel", *MBM*, Nov. 1989.
"Innovative Ironmaking at New Zealand Steel", Crawford, *Ironmaking*, 1982.

Primary Examiner—Melvyn Andrews
Attorney, Agent, or Firm—Roylance, Abrams, Berdo & Goodman, L.L.P.

[57] ABSTRACT

A submerged arc furnace produces foundry iron from scrap iron and steel sources where little or no slag is produced. Scrap iron or steel is fed into the submerged arc furnace with a source of silica and a carbonaceous reducing agent. The scrap iron and steel is melted while simultaneously smelting the silica in the presence of the carbonaceous reducing agent. The amount of the silica source and carbonaceous reducing agent are added in an amount to selectively control the silicon and carbon content of the resulting foundry iron.

34 Claims, 1 Drawing Sheet

PROCESS FOR FOUDRY IRON

FIELD OF THE INVENTION

The present invention relates to a process for producing foundry iron from scrap iron and/or scrap steel. More particularly, the invention is directed to a process of producing foundry iron in a submerged arc furnace using scrap iron or scrap steel as the primary iron sources.

BACKGROUND OF THE INVENTION

Foundry iron, used for casting and steel making, is produced in the iron industry in a number of different processes. The process used is typically dependent on the feed material and the intended use of the foundry iron.

One process of producing foundry iron utilizes a standard cupola-type furnace. A variety of iron sources such as scrap iron, scrap steel and pig iron are fed into the vertical shaft of the furnace fueled by combustion of coke by a blast of air. The charge added to the furnace generally contains a number of additives such as ferrosilicon to increase the silicon content of the iron and slag forming materials such as limestone to remove impurities such as sulfur. The iron produced by this process typically contains about 1 percent to 3 percent silicon and about 2 percent to 4 percent carbon.

The cupola-type furnace disadvantageously is a net silicon oxidizer with the result that as much as 30 percent of the available silicon is lost by oxidation and discharged in the slag. Typically, only about 70 percent of the available silicon is combined with the iron. Silicon is an essential element of foundry iron and is typically added in the form of ferrosilicon since such silicon is readily combinable with the iron. Ferrosilicon is an expensive source of silicon such that silicon losses through oxidation can significantly increase production costs.

The cupola-type furnace is desirable in many processes since it can be energy efficient and requires a relatively low capital investment. A cupola furnace is also easily scaled up for large production from a single unit and can be operated as a continuous charging and tapping process. Carbon is easily combined with the iron and is picked up naturally in the cupola as the melted iron and steel droplets pass over the hot coke and dissolve the carbon.

The feasibility of producing foundry iron is dependent in part on the efficiency of the process used and cost of the charging materials. The cost of scrap iron and scrap steel depends on several factors including the iron content, amounts of desirable and undesirable alloy constituents present, and the particle size. The cost of very fine or light scrap iron and steel, such as borings or turnings, is typically much less than heavier scrap such that it is desirable to use light scrap whenever possible. The use of light scrap in a cupola requires agglomeration or briquetting since the high volume of gases exiting the cupola otherwise carries an unacceptably large percentage of the charge from the furnace. Very fine or light iron scrap will be collected in the baghouse or scrubber resulting in a low recovery of iron and thus increased operating cost.

Foundry iron is also produced conventionally and commercially with the electric induction furnace. In the electric induction furnace the charge, which can be iron scrap, steel scrap and pig iron, is introduced into the furnace, melted; and, then additives, including silicon, carbon, and a slag forming material to cover the iron are introduced. The iron charge is heated by eddy currents resulting from electromagnetic induction from the alternating electric current flowing in the coil surrounding the charge. Silicon is typically added as ferrosilicon, and carbon is added in the form of a low sulfur content graphite material. The resulting iron generally has a silicon content of 1–3 percent and a carbon content of 2–4 percent.

The electric induction furnace disadvantageously is limited to a batch process where individual units are typically capable of producing less than 20 tons of iron per hour. In addition, the electric energy is fairly costly because of the inefficiency of being a batch process. Other disadvantages include the moderate to high refractory costs, high capital investment, high labor costs, high cost of ferrosilicon and carburizing additives, and limited scale up capability.

Another process of producing foundry iron is by smelting iron ore in a submerged arc electric furnace. Submerged arc furnaces have an advantage of directly smelting the ores, and producing desirable levels of carbon and silicon in the iron using the heat of the electric arc along with simultaneous carbothermic chemical reduction of metal oxides by the carbonaceous reducing agents, such as coke and coal. The electrodes are immersed in the charge and slag layer which forms above the molten iron. That arrangement permits efficient heat transfer between the arc and charge materials. However, the nature of the heating in the submerged arc furnace requires that the electrical conductivity of the charge be controlled to permit the simultaneous immersion of the electrodes deep into the charge while avoiding excessive currents in the electrodes, which excessive currents could cause the electrodes to overheat.

Iron ore has low electrical conductivity making it amenable to smelting in a submerged arc furnace. The prior production of foundry iron in submerged arc furnaces has been limited to the use of iron ore in the form of fines, lumps or pellets as the primary source of iron. One example of the use of a submerged arc furnace to smelt iron ore is disclosed in U.S. Pat. No. 4,613,363 to Weinert. A disadvantage of the conventional iron producing processes using a submerged arc furnace is that the carbothermic reduction of ores to produce iron requires large amounts of electric energy, thereby increasing the production costs. Alternatively, the more widely utilized processes of producing foundry iron (cupola and induction furnaces) require comparatively expensive starting materials, such as heavy iron or steel scrap; and prior-reduced silicon sources such as silicon carbide or ferrosilicon, which are relatively expensive sources of silicon. All of these characteristics have limited these prior processes for producing foundry iron. Accordingly, the iron industry has a continuing need for an economical and efficient process for producing foundry iron.

SUMMARY OF THE INVENTION

Accordingly, an object of the present invention is to provide an efficient and economical process for producing foundry iron using readily available and inexpensive feed materials.

A further object of the present invention is to provide a process for using scrap iron or scrap steel as the primary source of iron for producing foundry iron.

Another object of the present invention is to provide a process for producing foundry iron in a submerged arc furnace.

Yet another object of the present invention is to provide a process of melting scrap iron or scrap steel in a submerged arc furnace.

A further object of the present invention is to provide a process for simultaneously smelting silica and melting scrap iron or steel to produce foundry iron.

Another object of the present invention is to provide a process for producing foundry iron where substantially no slag is formed.

A further object of the present invention is to provide a process for melting scrap iron or steel in a submerged arc furnace and increasing the silicon and carbon content of the iron to produce foundry iron.

These and other objects of the present invention are basically attained by a process of producing foundry iron comprising the steps of feeding a charge into a submerged arc furnace about electrodes thereof, the charge comprising a mixture of an iron source, a silicon source and a carbonaceous reducing agent, the iron source comprising scrap iron or steel, and supplying electrical energy to the electrodes to generate an electrical arc therebetween, and heating the scrap iron or steel, the silicon source and the carbonaceous reducing agent in the furnace by the electrical arc between the electrodes to melt the scrap iron or steel and to produce foundry iron.

The process of the present invention is able to utilize inexpensive scrap iron or steel in the submerged arc furnace to produce foundry iron, while controlling the carbon and silicon content and substantially in the absence of slag formation. The silicon source is reduced to silicon in the presence of a carbonaceous reducing agent to increase and modify the silicon content of the foundry iron. The carbonaceous reducing agent produces carbon which is dissolved in the iron or steel.

Other objects, advantages and salient features of the present invention will become apparent from the following detailed description, which, taken in conjunction with the annexed drawings, discloses preferred embodiments of the present invention.

BRIEF DESCRIPTION OF THE DRAWING

Referring to the drawing which forms a part of this original disclosure.

DETAILED DESCRIPTION OF THE INVENTION

Figure 1:
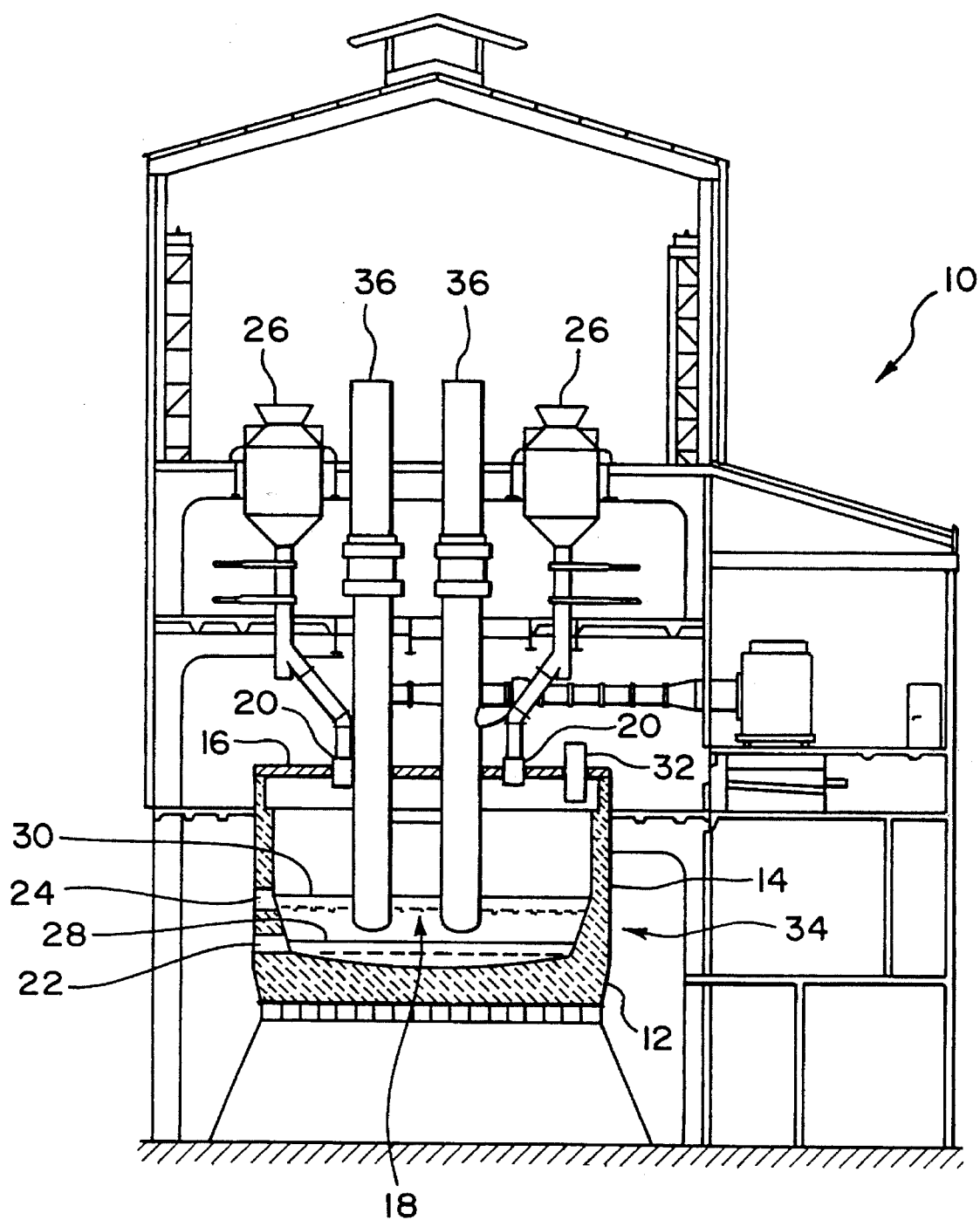
FIG. 1 is a side elevational view partially in cross-section of a submerged arc furnace for use in the process according to an embodiment of the present invention.

The process of the present invention basically comprises feeding a scrap iron or steel as a primary iron source, a silicon source, and carbonaceous materials which serve both as a carbon source for the iron and as reducing agents, into a submerged arc furnace to produce foundry iron. In preferred embodiments of the present invention, silica or a silica source is the primary silicon source. The heat produced by the electric arc in the furnace causes the carbonaceous reducing agent to reduce the silica to silicon which is taken up by the iron along with carbon from the reducing agents. In preferred embodiments, the process is carried out as a continuous process of simultaneously melting the iron sources and smelting the silica sources in the presence of the carbonaceous reducing agent.

As used herein, foundry iron is used to define the resulting iron product having at least about 0.05 percent by weight silicon and at least about 0.01 percent by weight carbon. The class of foundry iron includes various iron compositions, including, for example, pig iron, gray iron, ductile iron, malleable iron and cast iron. The foundry iron produced by the invention can be used directly without further processing to produce the desired product depending on the intended use of the iron. In further embodiments, the resulting foundry iron can be further processed to modify the composition and nature of the iron such as, for example, to produce steel.

In embodiments of the invention, the resulting foundry iron contains about 0.05 percent to about 9.5% percent silicon and about 0.01 percent to about 4.5 percent carbon with the balance iron and minor amounts of impurities such as sulfur, phosphorous, manganese, aluminum, chromium, titanium and other metals. As used herein the percentages are by weight unless otherwise indicated. In preferred embodiments of the invention, the foundry iron preferably comprises about 0.05 to about 9.5 percent silicon, and more preferably about 0.5 percent to about 4.0 percent silicon and about 2.0 percent to about 4.0 percent carbon. Typically, the foundry iron contains less than 3.0 percent silicon, about 2.0 percent to about 4.0 percent carbon and less than about 1.0 percent sulfur, phosphorous, aluminum, manganese, chromium and other impurities. Preferably, the foundry iron contains 0.10 percent by weight or less sulfur. In embodiments, the foundry iron contains about 0.25 to 3.0 percent by weight silicon. In further embodiments, the foundry iron contains about 2.0 percent by weight silicon.

Referring to FIGURE 1, a suitable submerged arc furnace for carrying out the process of the present invention is illustrated. The submerged arc furnace 10 includes a bottom lining or hearth wall 12, side walls 14 and a roof or top wall enclosure 16 to define a melting and smelting zone 18 and to collect and remove dust, fumes, and gases to a collection system. Feed openings 20 are provided in the roof 16 for feeding the charge or feed material into the furnace 10 by conveyors or feed supplies 26. In an alternative feed system, the charge materials are introduced by dumping the feed directly on top of the existing charge using a mechanical hopper charging scheme, as known in the art. One or more outlet taps 22 are included in the side wall 14 to draw molten metal 28 from the melting zone 18. A slag taphole 24 may also be included in side wall 14 to draw slag 30 from the melting zone 18. The shell 34 of the furnace 10 can be cooled with a water film (not shown). A spray ring can be located immediately beneath the side wall roof flange whereby the water is collected in a gutter at the bottom of the side walls 14. In embodiments of the invention, the roof or top wall can be split in its longitudinal dimension to allow charge material to be fed to any point in the furnace Three alternating current electrodes, 36 extend through the roof 16 into melting zone 18. The electrodes are generally arranged in a triangular configuration. In the embodiment of FIGURE 1, two electrodes are shown with the third electrode being positioned behind one of the illustrated electrodes. Electrodes 36 are independently controllable to selectively adjust their vertical position within the furnace, and to prevent overcurrents. The electrodes 36 can be raised or lowered to vary the arc length as known in the art, The furnace is typically a three phase alternating current furnace powered by variably selectable voltage of 30–300 volts with a maximum current of approximately 100,000 amperes per phase, The electrodes can be, for example: graphite electrodes; prebaked carbon electrodes; or Soderberg, or self-baking carbon electrodes, as known in the art, The electrodes are preferably carbon electrodes of the various forms known in the art.

Exhaust ducting 32 extends through the hood 16 positioned above the furnace to collect exhaust gases such as combustion gases, dust and fumes, emitted during the melting and smelting phases of the process, The exhaust gases are carried to a baghouse to clean the gases before discharging the gases to the atmosphere, The solids collected in the baghouse are recycled, processed, or discarded in a conventional manner.

An example of a suitable submerged arc furnace is produced by Elkem Technology of Oslo, Norway. In further embodiments, the submerged arc furnace can be a direct current (DC) arc furnace having a single electrode submerged in the charge with a suitable return electrode as known in the art, a plasma submerged furnace or an alternating current submerged arc furnace having at least two electrodes.

The submerged arc furnace provides continuous production of foundry iron by permitting continuous feeding of the furnace with the charge material and tapping of the molten metal from the lower regions of the furnace. The process can be readily scaled up for high production rates, while still controlling the output rate and the output composition of the iron. A suitable feed conveyor, hopper charging system, or charging tubes as known in the art, can be used for continuously supplying the charge materials to the furnace. The throughput or production rate of the furnace is dependent on the power supplied to the furnace and the feed rate of materials to the furnace. The furnace can be designed for an operating power level of from about 1 megawatt to about 100 megawatts depending on the furnace construction, type of electrodes and charge materials. Generally the alternating current furnace produces a ton of foundry iron product at an electric energy input of about 600 kilowatthours. Depending on the charge materials, product characteristics, and furnace construction, an alternating current submerged arc furnace can produce foundry iron at a rate of electric energy input of between about 500 to 1400 kilowatthours per ton of product.

The process of the invention is preferably carried out in the alternating current submerged arc furnace using a feed and power level so that the tips of the electrodes are embedded several feet into the bed of feed material in the furnace and within about one foot from the bath of molten metal pool. In this manner, the arc zone is formed close to the metal pool or bath. The furnace is operated to maintain the temperature of the molten alloy in the furnace between about 2100° F. to 3200° F. In preferred embodiments the temperature of the hearth of the furnace is maintained sufficiently high to allow adequate superheating of the molten metal for easy tapping and downstream handling or processing. The tips of the electrodes being submerged in the material and producing an arc close to the molten metal provide good heat transfer to the unprocessed material by radiation from the arc and the molten metal, and by convection from the hot carbon monoxide gas that is continuously being generated by the chemical reduction of metal oxides and silica by carbon in the lower regions of the charge bed.

A standard submerged arc furnace includes a self-protection mechanism or control system to automatically raise the electrodes from the charge to prevent excessive electrode currents which can result when the conductivity of the charge materials increases above a threshold level. As the electrodes are withdrawn from the charge bed material in response to increases in the charge conductivity, the temperatures near the furnace hearth decreases and, if prolonged, can result in inadequate heating and melting of the scrap and incomplete smelting of the silica. It is important to have the charge feed bed at a height and electrical conductivity to enable the electrodes to be embedded deep in the bed so that the arc forms about a foot above the metal bath.

Achieving the satisfactory immersion or penetration of the electrodes of the submerged arc furnace into the furnace charge bed is dependent on several factors including the specific electrical resistivity of the materials charged, their physical sizing, their distribution in the mix, and the operating voltage selected for the furnace. The operating voltage is selected to compensate for the relationship between the voltage, the electrode current, and the resistance of the charge materials to achieve deeper immersion of the electrodes into the charge. The resistance of the charge bed can be varied by varying the feed materials and size of materials to optimize operation to obtain the deepest electrode penetration in the charge bed for a given operating voltage.

The quantity of electrical energy required per ton of iron alloy produced is highly dependent on the degree of oxidation or reduction of the metallic materials charged, the amount of silica and other oxides required to reach the desired or target composition, the optimization of the electrode submerged operation, and the skill of the furnace operator. Alloys containing from about 0.5 percent to 4 percent carbon and about 0.25 percent to about 2.5 percent silicon typically require about 500 to about 650 kilowatthours per ton of alloy produced. Higher silicon percentages and correspondingly lower carbon percentages require an increase of about 10 kilowatthours for highly non-oxidized iron sources for each additional 0.1 percent increase in silicon above about 2.5 percent silicon in the alloy.

The raw materials constituting the charge to be fed to the submerged arc furnace are preferably blended prior to feeding into the furnace. Alternatively, the different components of the charge can be fed simultaneously from separate supplies into the furnace at a controlled rate and in the desired ratios. The composition of the resulting foundry iron is dependent on the charge composition and the degree of chemical reduction which occurs in the furnace. The charge materials comprise an iron source which includes scrap iron or scrap steel, a silicon source and a carbonaceous reducing agent as discussed hereinafter in greater detail. Generally, silica is the primary silicon source. The melting of the iron and smelting of the silica in preferred embodiments is substantially in the absence of an oxygen feed or oxidizing agent and an absence of slag forming materials.

The scrap iron and scrap steel are available as commodities as known in the metal industry. The market prices and grades of various types of scrap iron and steel are published regularly in various industry publications such as *American Metal Market*. Scrap iron and steel as known in the art is graded according to the metal particle size and composition. For example, one type of scrap steel is defined as: "Foundry steel, 2' max." Suitable sources of iron for use in the present invention include mill scale, direct reduced iron (DRI), hot briquetted iron (HBI), iron carbide, iron borings, steel turnings, shredded automobile steel and steel cans and mixtures thereof.

The composition of the scrap iron or steel will influence the composition of the resulting foundry iron. Several sources or grades of scrap iron can be blended prior to feeding to the furnace to provide the desired input and output compositions. The iron source generally comprises at least about 50 percent scrap, preferably about 75 percent scrap, and most preferably about 90 percent by weight scrap iron or scrap steel. The iron source can be based entirely on scrap iron or steel.

The scrap iron or steel can be mixed with other iron or steel materials to increase or decrease the percentage of various alloying metals in the resulting foundry iron composition. For example, direct reduced iron (DRI) and hot briquetted iron (HBI) which typically contain about 90 percent iron, and are low in undesirable residual elements, such as copper, can be added to increase the iron content of the foundry iron thereby diluting the alloying metals and reducing the percentage of undesirable metals, such as copper, chromium and manganese that are present in the other charge materials such as scrap steel used to produce the foundry iron. The amount and type of materials combined with the scrap iron and scrap steel are determined in part by the efficiency of the furnace in utilizing their components and the relative cost of the feed materials. For example, heavy steel scrap that is low in undesirable residual elements, is expensive in comparison with cast iron borings or steel turnings, so that large quantities of heavy scrap, while desirable from the standpoint of residual elements, are usually undesirable from an economic standpoint. By comparison, steel turnings, which are small in particle size and inexpensive compared to heavy steel scrap, usually contain high levels of undesirable residual elements. The use of the submerged arc furnace permits the use of very finely sized scrap materials, which, being less expensive than heavy scrap is an economic advantage for producing foundry iron over other processing methods.

The particle size of the charge material is important to obtain proper heating and melting of the scrap although there is no absolute limit. The scrap iron or steel generally has a size of 60 centimeters or less in any one dimension. A suitable size of the scrap iron or steel is about 25 millimeters or less. In alternative embodiments, the particle size of the scrap iron or steel is less than about 0.5 centimeters. The particle size of the feed is selected to be easily handled and charged into the furnace and melted without forming a bridge between the electrodes or between the electrodes and the side walls of the furnace. The submerged arc furnace in accordance with preferred embodiments is able to handle a small particle size scrap such as cast iron borings and steel turnings less than about 0.25 inch in the largest dimension, which are traditionally difficult to process without such preprocessing steps as agglomeration or briquetting. For example, mill scale and mill wastes are generally 6 inches or less and DRI/HBI are about 1¼ to 6 inches in the largest dimension. The particle size of the scrap iron or steel can range from small fines or borings to large pieces. The upper size limit is generally the face to face spacing between the electrodes in an alternating current submerged arc furnace or between the electrode and the furnace refractory wall in a direct current submerged arc furnace to avoid bridging.

Scrap iron and scrap steel are highly conductive in comparison with iron ore so that in the use of scrap materials as the iron sources in the present process the electrical conductivity and resistivity of the feed must be selected and controlled to permit deep immersion of the electrodes. The electrical resistivity of the feed can be modified by the selection of the particle size of the feed and the type of materials. Reducing the particle size of the feed material increases the resistivity of the feed. The most efficient particle size will depend on its inherent resistivity and the dependence of the permeability of the furnace charge to the passage of exhaust gases on the particle sizes of the charged materials.

Processing costs to reduce the particle size are also considered in selecting the particle size of the charge. In preferred embodiments, the feed material contains substantially no iron ore although minor amounts of iron ores can be added to modify the resistivity of the feed. Highly oxidized mill waste or resistive iron sources can also be used to modify the resistivity.

The charge material also includes an amount of a silicon source such as, for example, silica, silica source or silicon dioxide in a reducible form. Silica is the preferred silicon source. The source of the silicon dioxide can be any commercially available material which can be smelted and reduced to silicon in the submerged arc furnace in the presence of a carbonaceous reducing agent simultaneously with the melting of the scrap iron and scrap steel. The silicon is produced in a form which can combine directly with the iron. In preferred embodiments, the silicon source is a high purity quartzite. In alternative embodiments, other sources, as known in the art, can be used such as silica-containing ore, waste residues and sand which has been washed to remove the clays and other impurities. Typically, the charge is substantially absent of ferrosilicon or silicon carbide. In preferred embodiments, the silicon source contains at least about 98 percent by weight silica. The impurities are preferably removed to avoid the formation of slag in the furnace since slag increases the energy demand for smelting and melting of the feed.

The quartzite used in preferred embodiments as the primary silica source is substantially free of clays and other extraneous materials such as metal oxides which would contribute to undesirable slag formation, as well as undesirable contamination of the resulting foundry iron with trace metals. The quartzite is generally sized, high purity quartzite pebbles or crushed quartzite containing at least 95 percent silica. The particle size of the source of silica is determined by the particular dimensions of the furnace, the electrodes and the residence time of the feed materials in the furnace to ensure complete reduction to silicon in the presence of a reducing agent. Generally, quartzite has a particle size of 4 inches or less although large furnaces can utilize larger particles. The source of silica preferably contains less than about 0.5 percent by weight aluminum, magnesium, zinc and titanium oxides. Some of these metals, such as zinc, can be oxidized and removed by a flow of air or oxygen through the furnace and removed in the baghouse. Other metal oxides are reduced in the furnace to the metal which can combine with the iron.

The amount of the silicon source added to the furnace with the feed is determined by theoretical calculations of the desired silicon content of the resulting foundry iron. The amount of the silicon source added is also based on stoichiometric calculations taking into account the calculated silicon content of the scrap iron and other feed metals and the calculated losses due to predicted volatilization in the reduction of silica to elemental silicon. The silicon source can be added in the amount of about 0.01 percent to about 20 percent by weight based on the weight of the scrap iron or steel. Typically, the silicon source is less than about 10 percent and preferably less than about 5 percent by weight of the scrap iron or steel. Generally, about 90 percent or more of the available silicon combines with the iron while the remaining silicon is lost as silica fume, and, if formed, as slag. Silicon recoveries typically greater than 90 percent are experienced when alloys of 3% or less contained silicon are produced.

The carbonaceous reducing agent can be any carbon source capable of reducing silica in the furnace. Examples of suitable carbonaceous reducing agents include char, charcoal, coal, coke such as petroleum or bituminous coke, woodchips and mixtures thereof. The preferred carbonaceous materials have a high fixed carbon content and also have a low ash content, low moisture content, low calcium oxide and aluminum oxide levels, and low sulfur and phosphorous levels. The carbonaceous materials in preferred embodiments further have high reactivity and high electrical resistance. A preferred carbonaceous material is bark-free, hardwood woodchips from a hardwood such as oak. Woodchips provide a source of carbon for reducing the silica to elemental silicon as well as a means of reducing the electrical conductivity of the feed in the furnace so that the electrodes can be deeply immersed into the submerged arc furnace to maintain the desired melting temperature of the scrap and smelting of the silica. The feed can contain about 5 percent to 40 percent by weight of the carbonaceous reducing agents based on the weight of the iron. Preferably, the feed contains at least about 5 percent carbonaceous reducing agents based on the weight of iron.

The amount of the carbonaceous reducing agent added to the feed is determined by calculating the stoichiometric amount of fixed carbon needed to reduce the silica to silicon and the amount of free carbon needed to provide the desired carbon content in the resulting foundry iron. The theoretical calculations are based on the fixed carbon content of the coal, charcoal, coke, woodchips or other carbonaceous reducing agent according to standard calculations as known in the metallurgical industry. The amount, type and particle sizes of the carbonaceous reducing agent affect the resistivity of the feed material. For example, charcoal can be used in large proportions to increase resistivity since preferred charcoals have a higher resistivity than coke or coal. The process can be conducted in the complete absence of coke.

The particle size of the carbonaceous reducing agent is selected according to the composition of the feed materials, the reactivity, and the electrical resistivity or conductivity of the feed composition. A suitable size of woodchips is generally about 6 inches or less in the longest dimension. A suitable size for metallurgical grade coke is about ½ inch or less. Coal is typically about 2 inches or less while char and charcoal are typically 6 inches or less in the largest dimension.

The charge composition preferably contains only minor amounts of sulfur, phosphorous, calcium, aluminum, chromium, zinc and other metals which are undesirable in foundry iron alloys. The use of charge materials having few impurities contributes to little or no slag formation. Operating the submerged arc furnace substantially in the absence of slag has the added benefit of the heat from molten iron preheating the feed material being charged to the furnace since there is little or no slag shielding the molten iron from the feed material. Slag formation is generally avoided whenever possible since the presence of slag increases the energy consumption and reduces the efficiency of the melting of the scrap and the reduction of the silica to silicon. Excessive slag formation also inhibits the flow of the feed materials to the heating zone of the furnace and increases the likelihood of bridging of the feed in the furnace.

In embodiments where the feed material contains high amounts of sulfur or other impurities, a slag forming component can be added as needed. Suitable slag forming components include limestone (calcium carbonate), lime-(calcium oxide), or magnesia although other slag forming components as known in the art can be used. When necessary for efficient operation, lime having a particle size of less than 3 millimeters can be used.

In preferred embodiments the process of producing foundry iron is carried out in a submerged arc furnace in the absence of iron ore and coke, and generally produces a foundry iron product having a temperature of between about 2100° F. to 3200° F. and less than about 0.1 percent by weight slag compared with 1 percent to 10 percent by weight slag of conventional foundry iron processes using a submerged arc furnace. Typically, the foundry iron is produced substantially in the absence of slag.

Embodiments of the process of the invention are disclosed in the following non-limiting examples.

EXAMPLES 1–12

Scrap steel from clean steel punchings and pieces of sheared plate with little surface oxide was blended with coke, quartzite and wood chips to produce a feed blend for each example. The metal analysis of the scrap is shown in Table 1. The quartzite was a high purity, washed Spanish quartzite with a particle size of less than 3 millimeters. The coke was metallurgical coke fines having a particle size of less than 3 millimeters. The wood chips were Norwegian oak having an average particle size of about 75 millimeters by 50 millimeters by 15 millimeters. The scrap had an average particle size of about 25 millimeters by 5 millimeters by 4 millimeters. The wood chips had about 17 percent by weight fixed carbon and the coke had about 93 percent by weight fixed carbon for examples 1–8 and coke had about 86.5 percent by weight fixed carbon for examples 9–12.

TABLE 1

|      | Examples 1–5 | Examples 6–12 |
| ---- | ------------ | ------------- |
| % Al | 0.039        | 0.041         |
| % Si | 0.380        | 0.470         |
| % P  | 0.105        | 0.079         |
| % S  | 0.017        | 0.017         |
| % Ti | 0.010        | 0.025         |
| % V  | 0.009        | <0.002        |
| % Cr | 0.759        | 0.781         |
| % Mn | 0.397        | 0.391         |
| % Ni | 0.190        | 0.140         |
| % Cu | 0.355        | 0.351         |
| % Nb | 0.003        | 0.005         |
| % Mo | <0.003       | 0.003         |
| % Sn | <0.002       | <0.003        |
| % La | 0.006        | 0.006         |
| % Ce | 0.008        | 0.008         |
| % Fe | 97.722       | 97.683        |

The feed material for Examples 1–12 were blended in the proportions shown in Tables 2 and 3. The percentage values for the wood chips, coke and quartzite presented in Table 3 are by weight based on the weight of the scrap.

TABLE 2

| Example | Wt Scrap kg | Wt woodchip kg | Wt Coke kg | Wt quartz kg | Wt metal kg |
| ------- | ----------- | -------------- | ---------- | ------------ | ----------- |
| 1       | 158.000     | 93.000         | 14.000     | 53.000       | 154         |
| 2       | 146.000     | 85.000         | 8.500      | 32.000       | 156         |
| 3       | 137.000     | 80.000         | 8.000      | 12.800       | 122         |
| 4       | 133.000     | 55.800         | 7.750      | 12.400       | 146         |
| 5       | 129.000     | 54.000         | 7.500      | 12.000       | 151         |
| 6       | 132.400     | 46.200         | 7.700      | 9.240        | 136         |
| 7       | 132.400     | 33.000         | 7.700      | 9.240        | 123         |
| 8       | 141.500     | 17.690         | 8.290      | 7.050        | 150         |
| 9       | 120.400     | 10.000         | 7.000      | 6.000        | 134         |
| 10      | 120.400     | 5.000          | 7.000      | 4.200        | 125         |
| 11      | 180.600     | 7.500          | 10.500     | 9.000        | 167         |
| 12      | 192.600     | 8.000          | 11.200     | 9.600        | 151         |

TABLE 3

| Example | % Woodchips | % Coke | % Quartz |
|---------|-------------|--------|----------|
| 1. | 58.861 | 8.861 | 33.544 |
| 2. | 58.219 | 5.822 | 21.918 |
| 3. | 58.394 | 5.839 | 9.343 |
| 4. | 41.955 | 5.827 | 9.323 |
| 5. | 41.860 | 5.814 | 9.302 |
| 6. | 34.894 | 5.816 | 6.979 |
| 7. | 24.924 | 5.816 | 6.979 |
| 8. | 12.502 | 5.859 | 4.982 |
| 9. | 8.306 | 5.814 | 4.983 |
| 10. | 4.153 | 5.814 | 3.488 |
| 11. | 4.153 | 5.814 | 4.983 |
| 12. | 4.154 | 5.815 | 4.984 |

The furnace used in examples 1–12 was a bench scale submerged arc furnace made by Elkem Technology, Norway. The submerged arc furnace was a two electrode, single phase alternating current furnace with transformer rating of 300 kVA, maximum current 3000 A, with secondary voltage taps of 15–150 V in 1.5 V steps. The initial start-up of the furnace was accomplished by charging 16 kilograms of scrap steel and 5 kilograms of coke into the furnace and the electrodes lowered to contact the scrap. The power was turned on to melt the scrap. The blended feed material was charged into the furnace to maintain the furnace about half filled with scrap. The molten metal was tapped and analyzed. The analysis of each Example is shown in Table 4. The furnace bath tap temperatures were about 1250°–1550° C.

TABLE 4

|  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| % Si | 9.410 | 6.440 | 4.020 | 3.880 | 3.900 | 3.380 | 3.040 | 2.910 | 2.310 | 1.800 | 1.880 | 2.350 |
| % C | 1.730 | 2.270 | 3.150 | 3.470 | 3.420 | 3.340 | 3.290 | 3.780 | 3.570 | 3.660 | 3.230 | 3.610 |
| % Al | 0.009 | 0.009 | 0.010 | 0.008 | 0.013 | 0.180 | 0.447 | 0.031 | 0.016 | 0.019 | 0.014 | 0.051 |
| % P | 0.097 | 0.100 | 0.099 | 0.088 | 0.089 | 0.094 | 0.095 | 0.080 | 0.037 | 0.023 | 0.046 | 0.053 |
| % S | 0.040 | 0.032 | 0.028 | 0.027 | 0.040 | 0.047 | 0.029 | 0.041 | 0.036 | 0.044 | 0.033 | 0.033 |
| % Ti | 0.010 | 0.011 | 0.014 | 0.016 | 0.013 | 0.012 | 0.013 | 0.013 | 0.012 | 0.011 | 0.019 | 0.019 |
| % V | 0.008 | 0.008 | 0.008 | 0.007 | 0.008 | 0.009 | 0.009 | 0.008 | <0.002 | <0.002 | <0.002 | <0.002 |
| % Cr | 0.618 | 0.642 | 0.704 | 0.695 | 0.673 | 0.689 | 0.687 | 0.552 | 0.219 | 0.087 | 0.418 | 0.466 |
| % Mn | 0.305 | 0.306 | 0.345 | 0.375 | 0.373 | 0.366 | 0.678 | 0.552 | 0.219 | 0.087 | 0.418 | 0.466 |
| % Ni | 0.180 | 0.180 | 0.180 | 0.170 | 0.170 | 0.180 | 0.180 | 0.150 | 0.080 | 0.050 | 0.090 | 0.100 |
| % Cu | 0.342 | 0.342 | 0.335 | 0.324 | 0.120 | 0.333 | 0.342 | 0.277 | 0.115 | 0.060 | 0.199 | 0.217 |
| % Nb | 0.003 | 0.003 | 0.003 | 0.003 | 0.003 | 0.003 | 0.003 | 0.004 | 0.008 | 0.007 | 0.005 | 0.005 |
| % Mo | <0.003 | <0.003 | <0.003 | <0.003 | <0.003 | <0.003 | <0.003 | <0.003 | <0.003 | <0.003 | <0.003 | <0.003 |
| % Sn | <0.002 | <0.002 | <0.002 | <0.002 | <0.002 | <0.002 | <0.002 | <0.002 | <0.002 | <0.002 | <0.002 | <0.002 |
| % La | <0.003 | 0.003 | 0.004 | 0.004 | 0.003 | 0.004 | 0.005 | 0.004 | 0.004 | 0.005 | 0.004 | 0.005 |
| % Ce | 0.007 | 0.007 | 0.008 | 0.007 | 0.007 | 0.008 | 0.008 | 0.007 | 0.008 | 0.007 | 0.008 | 0.008 |
| % Fe | 87.23 | 89.642 | 91.087 | 90.921 | 91.136 | 91.290 | 90.314 | 91.586 | 92.637 | 94.133 | 93.629 | 92.610 |

These examples show that quartzite is smelted simultaneously with melting of the scrap. The carbon and silicon content of the resulting iron is proportional to the silica and fixed carbon in the feed.

EXAMPLE 13

A computer simulated operation consisted of a feed mix containing 2000 pounds of scrap iron, 100 pounds of woodchips, 85 pounds of coal, 20 pounds of coke and 75 pounds of quartzite charged into an alternating current submerged arc furnace at a rate of alloy production of 72.590 tons per hour. The projected power input to the furnace was 50,000 kilowatts. The simulated scrap iron feed was made up of 40 percent shredded auto steel, 15 percent remelt returns, 15 percent steel scrap #1, 20 percent Cast Iron borings, 5 percent tin plate/cans and 15 percent low chromium mixed turnings. The feed mix had a calculated alloy composition of 2.5 percent silicon, 3.85 percent carbon, 0.40 percent manganese, 0.10 percent chromium, 0.15 percent nickel, 0.15 percent copper, 0.01 percent sulfur, 0.05 percent phosphorus and 0.03 percent tin with the balance iron where the percentages are by weight.

The projected resulting iron product as tapped from the furnace had an iron content of 92.5 percent, a carbon content of 3.85 percent and a silicon content of 2.50 percent by weight with the balance impurities. The calculated energy consumption was 650 kilowatt hours per ton of the iron alloy.

EXAMPLE 14

A computer simulated production run consisted of a feed mix containing 2000 pounds of scrap iron, 100 pounds of woodchips, 210 pounds of coal, 25 pounds of coke, and 393 pounds of quartzite charged into an alternating current submerged arc furnace at a projected rate of alloy production of 34.68 tons per hour. The furnace power input selected was 50,000 kilowatts. The projected scrap iron was a blend comprising 40 percent shredded auto steel, 15 percent remelt returns, 10 percent mixed turnings, 20 percent Cast Iron borings, 5 percent tinplate/cans and 10 percent low chromium mixed turnings. The feed mix had a calculated alloy composition of 9 percent silicon, 1.5 percent carbon, 0.4 percent manganese, 0.18 percent chromium, 0.09 percent nickel, 0.19 percent copper, 0.14 percent sulfur, 0.03 percent phosphorous and 0.02 percent tin and the balance iron, where the percentages are by weight.

The projected resulting iron alloy as tapped from the furnace had an iron content of 87.87 percent, a carbon content of 1.50 percent and a silicon content of 9.01 percent by weight with the balance impurities. The calculated energy consumption was 1370 kilowatt hours per ton of the iron alloy.

EXAMPLE 15

A computer simulated run consisting of a feed mix containing 2000 pounds of scrap iron, 100 pounds of woodchips, 35 pounds of coal and 55 pounds of quartzite charged to an alternating current submerged arc furnace at a projected production rate of alloy of 80.922 tons per hour. The furnace power selected was 50,000 kilowatts. The scrap iron input was made up of 40 percent shredded auto steel, 15 percent remelt returns, 10 percent mixed steel turnings, 20 percent Cast Iron borings, 5 percent tinplate/cans and 10 percent low chromium mixed turnings. The simulated feed mix had an alloy composition of 2 percent silicon, 2 percent carbon, 0.40 percent manganese, 0.10 percent chromium, 0.15 percent nickel, 0.15 percent copper, 0.01 percent sulfur, 0.05 percent phosphorous and 0.03 percent tin and the balance iron where the percentages are by weight.

The projected resulting iron alloy as tapped from the furnace had an iron content of 94.52 percent iron, 2.05 percent silicon and 2.00 percent carbon with balance impurities. The calculated energy consumption was 600 kilowatt hours per ton of the iron alloy.

While several embodiments have been shown to illustrate the invention, it will be understood by those skilled in the art that various changes and modifications can be made therein without departing from the scope of the invention as defined in the appended claims.

What is claimed is:

1. A process of producing foundry iron comprising the steps of:

feeding a charge into a submerged arc furnace about electrodes thereof, said charge comprising a mixture of an iron source, a silicon source and a carbonaceous reducing agent, said iron source comprising scrap iron or steel, supplying electrical energy to said electrodes to generate an electrical arc therebetween, and heating the scrap iron or steel, the silicon source and the carbonaceous reducing agent in the furnace by the electrical arc between the electrodes to melt the scrap iron or steel and to produce foundry iron having a silicon content of about 0.05 percent to about 9.5 percent by weight.

2. The process of claim 1, comprising continuously feeding the charge and continuously withdrawing molten foundry iron from said furnace.

3. The process of claim 1, further comprising melting the scrap iron or steel and producing foundry iron having a carbon content of about 0.01 percent to about 4.5 percent by weight.

4. The process of claim 1, comprising heating said charge in a DC submerged arc furnace.

5. The process of claim 1, wherein the silicon source is substantially pure quartzite or sand.

6. The process of claim 1, wherein the carbonaceous reducing agent is selected from the group consisting of wood chips, char, charcoal, coal, petroleum coke, bituminous coke and mixtures thereof.

7. The process of claim 1, comprising melting the scrap iron or steel and producing foundry iron substantially in the absence of slag.

8. The process of claim 1, wherein the iron source comprises at least 50 percent by weight scrap iron or steel.

9. The process of claim 1, wherein the iron source comprises at least about 90 percent by weight scrap iron or steel.

10. The process of claim 1, wherein the charge comprises about 0.01 percent to about 20 percent by weight silica as the silicon source based on the total weight of the scrap iron or steel.

11. The process of claim 1, wherein the charge comprises at least about 5.0 percent by weight of said carbonaceous reducing agents based on the weight of iron in the charge.

12. The process of claim 1, wherein the process is carried out in the absence of coke as a charge material.

13. The process of claim 1, wherein said submerged arc furnace is an alternating current submerged arc furnace having at least two spaced apart electrodes, each having a lower end, said process comprising submerging said ends of said electrodes in said charge with said ends spaced above a molten metal bath in said furnace to produce an arc zone above said bath.

14. The process of claim 13, comprising submerging said ends of said electrodes into said charge at least about 2 feet.

15. The process of claim 13, comprising submerging said electrodes into said charge wherein said electrode ends are spaced from the molten metal bath about 1 foot.

16. The process of claim 1, wherein said furnace includes at least one electrode, said process comprising applying an electric potential of about 100 volts to said at least one electrode.

17. The process of claim 1, wherein the silicon source is silica and the process further comprises smelting said silica in the presence of the carbonaceous reducing agent to produce silicon, and producing the foundry iron having a silicon content of about 0.05 percent to about 9.5 percent by weight.

18. The process of claim 1, wherein said submerged arc furnace is a plasma submerged arc furnace.

19. The process of claim 1, further comprising melting the scrap iron or steel to produce said foundry iron having a carbon content of about 2 percent to 4 percent by weight.

20. The process of claim 1, further comprising melting the scrap iron or steel to produce said foundry iron having a silicon content of about 0.5 percent to about 4.0 percent by weight.

21. The process of claim 1, further comprising melting the iron source in said furnace at a temperature between 2100° F. and 3200° F.

22. A continuous process of producing foundry iron comprising the steps of:

continuously feeding a charge comprising a mixture of scrap iron or steel, a silica source and a carbonaceous reducing agent into a submerged arc furnace about electrodes thereof, supplying electrical energy to the electrodes to generate an electrical arc therebetween, and melting said scrap iron or steel and simultaneously smelting said silica source in the presence of said carbonaceous reducing agent by the electrical arc between the electrodes to produce silicon and to produce foundry iron having a silicon content of about 0.05 percent to about 9.5 percent by weight and a carbon content of about 0.01 percent to about 4.5 percent by weight substantially in the absence of slag.

23. The process of claim 22, wherein the scrap iron or steel has a particle size of less than about 60 centimeters.

24. The process of claim 22, wherein the scrap iron or steel has a particle size of less than about 0.5 centimeters.

25. The process of claim 22, wherein the charge is substantially in the absence of iron ore and ferrosilicon.

26. The process of claim 22, wherein the charge contains at least about 5.0 percent by weight wood chips based on the weight of iron in said charge.

27. The process of claim 22, wherein the silica source is substantially pure quartzite.

28. The process of claim 22, wherein the foundry iron has a silicon content of about 0.25 percent to about 3.0 percent by weight.

29. The process of claim 22, wherein the foundry iron has a silicon content of about 2.0 percent by weight.

30. The process of claim 22, comprising feeding the said charge into said furnace substantially in the absence of coke.

31. The process of claim 22, wherein the carbonaceous reducing agent is selected from the group consisting of charcoal, wood chips, coal, coke and mixtures thereof.

32. The process of claim 22, wherein the scrap iron or steel contains at least about 98 percent by weight iron.

33. The process of claim 22, comprising operating the furnace at a bath temperature between about 2100° F. and about 3200° F.

34. A continuous process of producing foundry iron comprising the steps of:

continuously feeding a charge comprising a mixture of scrap iron or steel, a silica source and a carbonaceous reducing agent into a DC submerged arc furnace about at least one electrode thereof to form a charge bed, supplying electrical energy to the electrode to generate an electrical arc, and melting said scrap iron or steel and simultaneously smelting said silica source in the presence of said carbonaceous reducing agent by the electrical arc to produce silicon and to produce foundry iron having a silicon content of about 0.05 percent to about 9.5 percent by weight and a carbon content of about 0.01 percent to about 4.5 percent by weight substantially in the absence of slag.

* * * * *

UNITED STATES PATENT AND TRADEMARK OFFICE
CERTIFICATE OF CORRECTION

PATENT NO.   : 5,588,982
DATED        : December 31, 1996
INVENTOR(S)  : Charles F. Hendrix It is certified that error appears in the above-indentified patent and that said Letters Patent is hereby corrected as shown below:

On the cover page, item [54] and Column 1, line 1,

"[54] PROCESS FOR PRODUCING FOUDRY IRON"

should read

-- [54] PROCESS FOR PRODUCING FOUNDRY IRON --.

Signed and Sealed this

Fourth Day of March, 1997

Attest:

BRUCE LEHMAN

*Attesting Officer*              *Commissioner of Patents and Trademarks*